March 2, 1943.   F. G. GRONEMEYER   2,312,639
APPARATUS FOR TREATING PLASTIC MATERIAL
Filed Aug. 2, 1940   2 Sheets-Sheet 2
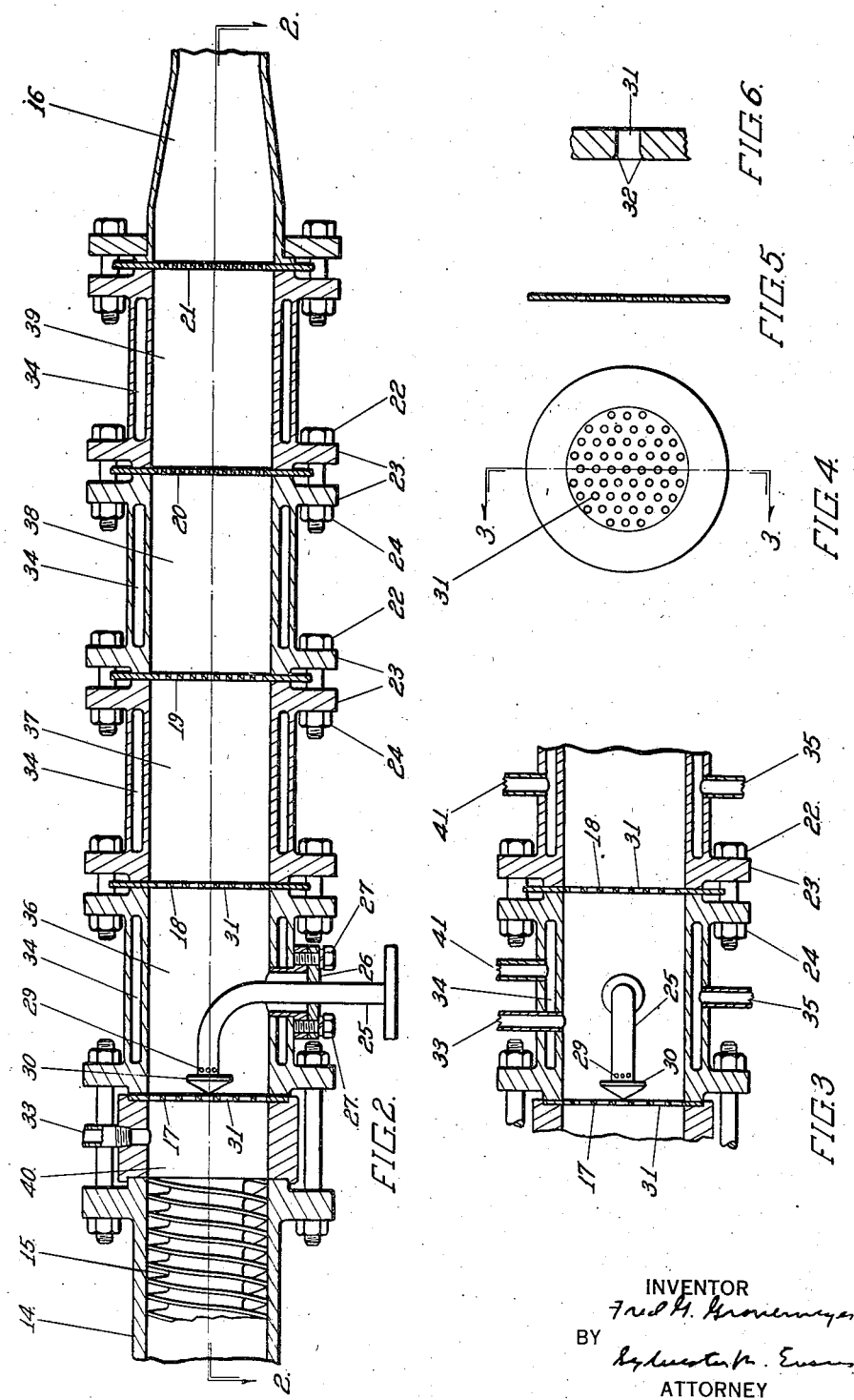
INVENTOR
Fred G. Gronemeyer
BY
Sylvester P. Evans
ATTORNEY Patented Mar. 2, 1943

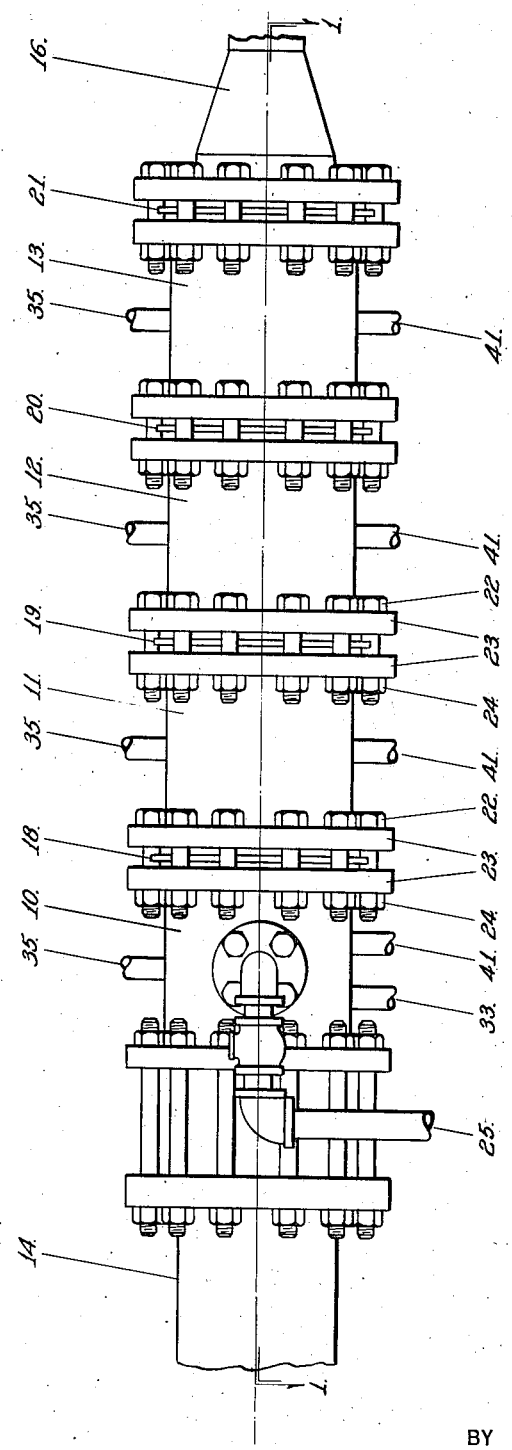

2,312,639

UNITED STATES PATENT OFFICE 2,312,639

APPARATUS FOR TREATING PLASTIC MATERIAL

Fred G. Gronemeyer, Longmeadow, Mass., assignor to Monsanto Chemical Company, St. Louis, Mo., a corporation of Delaware Application August 2, 1940, Serial No. 349,415

5 Claims. (Cl. 259—4)

This invention relates to an apparatus whereby plastic materials are rendered more readily soluble. More particularly, this invention relates to an apparatus whereby difficultly soluble plastic materials are more readily dissolved.

In the processing of plastic materials, it is frequently necessary to dissolve such materials in a suitable solvent. However, such materials, particularly, when they are obtained in the form of substantially large masses, are frequently extremely slow in dissolving, a difficulty that is generally believed to be related to their high molecular weight. When these materials are brittle and can be ground to a powder so as to increase their rate of solution by increasing their exposed surface, the difficulty of dissolving such materials is reduced. However, when such materials are substantially free from brittleness and, particularly, when they tend to possess such characteristics as flexibility, toughness, gumminess, elasticity, tackiness, adhesiveness and the like, grinding these materials is difficult, if not impossible, and a serious problem is presented. For example, high molecular weight masses comprising such plastic materials as polyvinyl acetate have been found to be extremely difficult to dissolve and, thus, have presented a serious problem in the art. One cause of this difficulty lies in the self-adhesive properties of such materials which makes difficult contact of solvent with large surface areas of the plastic by customary methods of preparing solutions.

One object of this invention is to provide an apparatus whereby plastic materials may be more readily dissolved. Another object is to provide a method and apparatus whereby difficultly soluble plastic materials may be rendered more readily soluble. A further object of the present invention is to provide for the relatively rapid absorption of solvent by self-adhesive plastic materials.

According to the principles of the present invention, it has been found that extrusion of plastic materials, in such a manner that the plastic mass is repeatedly broken up in the presence of solvent and, preferably, at a raised temperature, transforms such materials initially into plastic-solvent mixtures that can be more readily dissolved and finally into solutions of any desired viscosity. In carrying out the process of this invention, it is preferable, in some instances, to regulate the amount of solvent and other processing conditions so that the plastic material is transformed into a relatively easily soluble plastic-solvent mixture rather than to a complete and readily flowable solution. While the exact physical condition of the various types of plastic materials may not necessarily be the same at this point, nevertheless, absorption of substantial amounts of solvent by the plastic will have taken place so that final solution by customary methods of preparing solutions is rendered easier. The solvent employed in carrying out this process is not limited to any particular type of solvent and may comprise mixtures of one or more solvents and, if desired, a portion of the solvent may be replaced by a diluent which is a non-solvent for the plastic.

The following is a description of the operation of one embodiment of this invention whereby plastic materials are rendered more readily soluble. Plastic material, at a suitable temperature, is forced by suitable means, for example, by a rotatably movable feed screw, through a series of chambers which may be described as mixing chambers. According to this invention, the plastic mass flowing through this series of chambers is formed into one or more sections of reduced cross-section at several successive points, by partially blocking the passage of the plastic in a suitable manner, as for example, by employing perforated plates containing a plurality of relatively small openings, hereinafter described as breaker plates, as the end walls of these chambers. Following one or more of these points of division of the plastic mass, a solvent for the plastic is forced into one or more of these mixing chambers. Thus, during the flow of the plastic through subsequent mixing chambers, solvent acts on the plastic, said action being enhanced by the increase in exposed surface that occurs as a result of the separation of sections of the mass as the plastic passes through the restricted openings. The points of injection of solvent into the mixing chambers are preferably situated so as to injection solvent around the plastic material before the separated sections of the plastic mass can re-coalesce, thus enabling the solvent to immediately contact as much of the exposed surface of the plastic mass as possible. In addition, it is particularly preferable that the first injection of solvent follow the first breaker plate in order to immediately start the action of the solvent on the plastic material. If desired, the mixing chambers may be heated by suitable means to maintain the plastic at any desired temperature.

The conditions under which the aforesaid operation of the apparatus is carried out are so arranged as regards the size and number of mixing chambers, the configuration of and the number of breaker plates and the amount and type of solvent injected, that the plastic is either dissolved or in a more readily soluble condition when it leaves the last mixing chamber.

The apparatus of the present invention that is preferably employed in carrying out this new and novel process is shown in the accompanying drawings.

Fig. 1 is a side elevational view of the apparatus embodying the mixing chambers of this invention.

Fig. 2 is a sectional view taken on line 1—1 of Fig. 1 with the solvent pipe shown diagrammatically.

Fig. 3 is a sectional view, partly broken away, taken on line 2—2 of Fig. 2 with the solvent pipe shown diagrammatically.

Fig. 4 is an end view of a breaker plate.

Fig. 5 is a sectional view taken on line 3—3 of Fig. 4.

Fig. 6 is an enlargement of a portion of Fig. 5 showing the design of one of the openings in a breaker plate.

Before explaining in detail the apparatus of the present invention, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

The apparatus illustrated in the accompanying drawings comprises a series of hollow casings 10, 11, 12 and 13 having cylindrical chambers 36, 37, 38 and 39. Attached to casing 10 is another hollow casing 14, of which only a portion is shown, having cylindrical chamber 40 through which plastic material is supplied to the series of chambers 36, 37, 38 and 39 by means of screw 15. Attached to casing 13 is a hollow tapered connection 16, through which the processed plastic material is discharged after passage through the series of chambers 36, 37, 38 and 39.

Chambers 36, 37, 38 and 39 have as end walls, breaker plates 17, 18, 19, 20, and 21. The series of casings 14, 10, 11, 12 and 13 and discharge connection 16 are fastened together by means of threaded bolts 22 passing through openings in flanges 23 and tightened by threaded nuts 24 screwed on bolts 22. Gasket material, not shown in the drawings, is situated on both sides of the breaker plates, to prevent leakage of material from the apparatus.

Solvent is admitted through pipe 25 held in position by flange 26 and threaded bolts 27. Openings 29 allow the solvent to flow out of pipe 25 into chamber 36. Shoulder on cap 30 on the end of pipe 25 prevents plastic material from obstructing openings 29.

The breaker plates 17, 18, 19, 20 and 21 are perforated by circular holes 31. These circular holes 31 are smaller in size in plate 18 than in plate 17 and smaller in plate 19 than in plate 18. The holes in plates 20 and 21 are equal in size but smaller than those in plate 19. The holes 31 in these breaker plates have rounded corners 32 on the side at which the plastic material passes through the breaker plate as shown in Figure 6.

Nipples 33 are provided for attaching pressure gauges to chambers 36 and 40. Casings 10, 11, 12 and 13 are provided with heating means here shown as jackets 34, through which hot fluids can be circulated, embracing chambers 36, 37, 38 and 39. Nipples 35 and 41 represent inlet and outlet connections for supplying heating fluids, as for example, steam.

In the operation of the present invention plastic material, generally in a heated state, is forced by screw 15 from chamber 40 through breaker plate 17 into chamber 36. The extruded material, which may be in the form of rods, is met, as it enters chamber 36, by solvent from pipe 25 forced out of openings 29. The solvent tends to prevent the plastic material from re-coalescing and, at the same time, begins to soften and dissolve the plastic material. The mixture of plastic material and solvent is continuously forced forward by screw 15 and passes successively through breaker plate 18, chamber 37, breaker plate 19, chamber 38, breaker plate 20, chamber 39 and finally breaker plate 21 into the discharge connection 16. All the chambers 36, 37, 38 and 39 are heated by means of hot fluids circulated through jackets 34.

While the present invention is not limited in its scope by any theory as to its mode of operation, the following is advanced as one explanation of the improvements effected by the preferred process and apparatus of this invention. The sections of plastic material initially formed by extrusion through the first breaker plate correspond in shape to the configurations of the openings in this breaker plate. However, the extruded sections of the plastic are not believed to continue as straight extensions of the configurations imparted by the breaker plate openings. In the first place, the plastic material is likely to be substantially soft and, therefore, the initially extruded sections are liable to sag to the bottom of the chamber and re-coalesce. Furthermore, the pressure required to force the plastic through the openings in the succeeding breaker plate tends to hold back plastic material, particularly, when these openings are smaller and/or different in shape than those in the previous breaker plate. Thus, the first mixing chamber tends to fill up with plastic so that the extruded sections become subject to a great amount of distorting pressure. In addition, the dissolving and softening action of the solvent injected into this chamber contributes to distortion of the extruded material. Initial extrusion through the succeeding breaker plate forms the plastic material, to some extent, to configurations corresponding to the shapes of the openings in this breaker plate, although previous penetration of solvent may be such as to prevent complete continuity of the extruded material. In addition, the extruded material is subject to the same distorting forces as in the previous chamber. In any event, this second breaker plate is believed to break up the plastic so as to expose fresh surface to the action of the solvent that is moving along with the plastic material. This process of mixing solvent and plastic followed by breaking up the material so as to expose fresh surface to the action of the solvent, is repeated in the succeeding chambers and by the succeeding breaker plates respectively. As the breaker plate openings become smaller, the extruded sections become smaller in cross-sectional area with correspondingly more surface exposed to the solvent. Furthermore, as stated above, the plastic may in some cases possess less and less continuity as a result of the continued action of solvent. However, regardless of the mechanism of the process, the plastic emerges from the apparatus either in solution or in a more readily soluble condition as a result of absorption of substantial quantities of solvent. As previously indicated, the amount of solvent that has been absorbed by the plastic material and therefore the condition of the plastic as it emerges from the apparatus depends on the amount of solvent injected and the type of plastic material being treated as well as various process and apparatus conditions.

The present invention, as previously indicated, is applicable to plastic materials broadly. In general, this invention is particularly valuable for dissolving masses of thermoplastic materials, as for example, polyvinyl esters. If the process of this invention be employed for dissolving thermosetting resins, it is obvious to those skilled in the art that heating such resins to the insoluble, infusible stage must be avoided. Furthermore, this invention may also be employed in dissolving or partially dissolving plastic materials that are already subdivided or are capable of being subdivided without re-coalescing. In such cases, the utility of the present invention is lessened in that an alternative method is more readily available, whereas the solution of tough adhesive plastic masses by customary methods tends to be cumbersome and expensive. Thus, the process and apparatus of this invention are applicable to all soluble materials and mixtures thereof that soften and flow under pressure at temperatures below their decomposition temperatures.

The following is a specific example illustrating the preferred process of the present invention as applied to one type of plastic material. The parts are parts by weight in this example.

1870 parts of vinyl acetate, dissolved in 1430 parts of benzene were polymerized for substantially 4½ hours at substantially 74° C. in a suitable reaction vessel. After removal of the benzene by a suitable method, as for example, by steam distillation, a tough, gummy, adhesive mass of polyvinyl acetate was obtained that contained substantially 14 per cent water and was found to possess a viscosity after suitable purification, of substantially 60 centipoises at 20° C. in a 1 molar solution in benzene. Steam under a pressure of substantially 100 pounds per square inch was then injected into the reaction vessel above the mass of resinous material and the resin was thereby simultaneously heated and forced through a connecting passage into a suitable extruder, for example, a screw feed extruder. Then, the resin was forced by said extruder through the apparatus shown in the accompanying drawings. The pressure exerted on the plastic material was raised by the extruder to substantially 300 pounds per square inch as measured by the pressure gauge situated before the first breaker plate. During passage of the plastic through the mixing chambers, the pressure dropped somewhat and beyond the last breaker plate had dropped to substantially 200 pounds per square inch. The temperature of the plastic was maintained at substantially 110° C. during its passage through the mixing chambers by injecting steam into the jackets around the mixing chambers. A suitable solvent, as for example, ethanol, was injected into the mixing chamber beyond the first breaker plate at such a rate that 2 pounds of ethanol per pound of polyvinyl acetate were admitted at this point. After passing through the mixing chambers under the aforesaid conditions, the polyvinyl acetate and ethanol had formed a heterogeneous mixture comprising small masses of polyvinyl acetate substantially unaffected by solvent surrounded by material varying from a readily flowable solution of polyvinyl acetate in ethanol to transparent, jelly-like material comprising polyvinyl acetate which had absorbed sufficient solvent to be greatly softened but not sufficient to become a readily flowable solution. This polyvinyl acetate-ethanol mixture was in such a condition that it could now be relatively easily dissolved in any suitable solvent, as for example, ethanol, or could be pumped through a pipe line for further processing.

It is obvious that there are numerous features in the process and preferred apparatus for carrying out the process of the present invention that are subject to wide variation without departing from the essence of the invention. Among such variables are the following: pressure exerted on the plastic material during extrusion through the mixing chambers, temperature of the plastic material during extrusion; construction and number of mixing chambers; construction of the breaker plates, including the number, size and position of the openings in said breaker plates, number and location of points of injection of solvent into the mixing chambers; amount of solvent injected into the mixing chambers and type of solvent employed.

In the case of polyvinyl acetate, for example such solvents as methanol, acetic acid, a mixture of acetic acid and aqueous formaldehyde, butyl alcohol, butyl acetate and the like may be substituted for the ethanol given in the specific example.

This invention is limited solely by the claims attached hereto.

What is claimed:

1. In an apparatus for treating a plastic material with a solvent, a series of intercommunicating chambers separated by perforated plates, means for forcing plastic material through said chambers and perforated plates, means for introducing solvent into one of said chambers, said means comprising a conduit extending into said chamber in the direction against the flow of said material and having outlets thereon at a position behind and adjacent the middle of the discharge side of the perforated plate on the inlet side of said chamber, and adapted to direct said solvent radially from said conduit into said chamber and substantially normal to the main direction of flow of material through said chamber, and a deflector adapted to prevent plastic material from clogging said outlets on said conduit.

2. An apparatus as defined in claim 1 in which the perforations in said plates are smaller in the direction of flow of plastic material.

3. In an apparatus for treating a plastic material with a solvent, a series of intercommunicating connected chambers, means for forcing plastic material through said chambers under pressure, means for forming said plastic material into a plurality of elongated masses on passing from a first chamber to a second chamber and means for introducing solvent to said second chamber to a location in said second chamber near said last-mentioned means.

4. In an apparatus for treating plastic material with a treating agent, means for forming separated portions from a mass of plastic material, means for introducing treating agent to and contacting said exposed surfaces of said portions therewith after forming said separated portions, and means spaced from said first and second mentioned means for intermixing and separated portions and treating agent.

5. In an apparatus for treating a plastic material with a treating agent, a series of intercommunicating chambers, means for forcing plastic material through said chambers, means for substantially increasing the surface area of said plastic material on passing from a first chamber to a subsequent chamber in said series, means for introducing a liquid treating agent into said subsequent chamber at a location in said subsequent chamber near said last mentioned means after formation of said increased surface area and before recoalescence, and means spaced from said second and third mentioned means for intermixing said plastic material and treating agent.

FRED G. GRONEMEYER.